(12) United States Patent
Knapp et al.

(10) Patent No.: US 7,609,797 B2
(45) Date of Patent: Oct. 27, 2009

(54) CIRCUIT, SYSTEM, AND METHOD FOR PREVENTING A COMMUNICATION SYSTEM ABSENT A DEDICATED CLOCKING MASTER FROM PRODUCING A CLOCKING FREQUENCY OUTSIDE AN ACCEPTABLE RANGE

(75) Inventors: David J. Knapp, Austin, TX (US); Jason E. Lewis, Driftwood, TX (US)

(73) Assignee: Standard Microsystems Corporation, Hauppauge, NY (US)

( * ) Notice: Subject to any disclaimer, the term of this patent is extended or adjusted under 35 U.S.C. 154(b) by 1149 days.

(21) Appl. No.: 10/655,265

(22) Filed: Sep. 4, 2003

(65) Prior Publication Data

US 2005/0053179 A1    Mar. 10, 2005

(51) Int. Cl.
*H04L 7/00* (2006.01)
*H03D 3/24* (2006.01)
(52) U.S. Cl. .................................. 375/357; 375/376
(58) Field of Classification Search .................. 331/25, 331/57, 11; 375/376, 374, 317, 326, 327, 375/357; 370/535, 216, 503, 449; 327/148, 327/157; 360/51
See application file for complete search history.

(56) References Cited

U.S. PATENT DOCUMENTS

| | | | | |
|---|---|---|---|---|
| 4,782,483 A | * | 11/1988 | Lambert et al. | 370/449 |
| 5,245,637 A | * | 9/1993 | Gersbach et al. | 375/374 |
| 5,525,935 A | * | 6/1996 | Joo et al. | 331/11 |
| 5,535,337 A | * | 7/1996 | Hogan et al. | 709/248 |
| 5,652,758 A | * | 7/1997 | Donley | 370/503 |
| 5,914,991 A | * | 6/1999 | Gigandet et al. | 375/355 |
| 6,112,072 A | | 8/2000 | Stiegler et al. | |
| 6,121,816 A | * | 9/2000 | Tonks et al. | 327/296 |
| 6,147,825 A | * | 11/2000 | Alini et al. | 360/51 |

(Continued)

FOREIGN PATENT DOCUMENTS

WO     WO 01/06666     1/2001

OTHER PUBLICATIONS

European Search Report, Application No. 04020230.1, mailed May 8, 2006.

*Primary Examiner*—Don N Vo
(74) *Attorney, Agent, or Firm*—Kevin L. Daffer; Daffer McDaniel, LLP

(57) ABSTRACT

A communication system, clock recovery circuit, and method are provided for allowing data to be transmitted across a communication system and between clock recovery circuits absent a clock master specifically designed for one node of the communication system. Absent a clock master, the communication system is permitted to enter into an all slave mode, with periodic unlock conditions possibly rotating about the communication system ring topology. However, the unlock condition can be readily detected and if the received data bitstream formed into a recovered clock exceeds a threshold above or is less than a threshold below a reference clock generated during instances of unlock, then the clock recovery circuit will fix the synchronizing clock to the reference clock, and cause the bitstream to resynchronize to the reference clock before the reference clock is again disabled to allow the communication system to re-enter the all slave and rotating unlock condition. Periodic application of a reference clock interspersed with periodic application of a clock having transitions equal to the incoming bitstream proves advantageous in avoiding a design where a dedicated master must be used within a specified communication system node.

24 Claims, 5 Drawing Sheets

U.S. PATENT DOCUMENTS

| | | | |
|---|---|---|---|
| 6,308,298 B1* | 10/2001 | Blatchley et al. | 714/775 |
| 6,404,825 B1 | 6/2002 | Efstathiou | |
| 6,438,178 B1* | 8/2002 | Lysdal et al. | 375/317 |
| 6,754,171 B1* | 6/2004 | Bernier et al. | 370/216 |
| 6,792,005 B1* | 9/2004 | Antosik et al. | 370/535 |
| 6,831,523 B1* | 12/2004 | Pastorello et al. | 331/25 |
| 6,990,159 B1* | 1/2006 | Balb et al. | 375/354 |
| 2002/0041215 A1* | 4/2002 | Kiyose | 331/57 |
| 2002/0051510 A1* | 5/2002 | Noguchi | 375/376 |

* cited by examiner

CIRCUIT, SYSTEM, AND METHOD FOR PREVENTING A COMMUNICATION SYSTEM ABSENT A DEDICATED CLOCKING MASTER FROM PRODUCING A CLOCKING FREQUENCY OUTSIDE AN ACCEPTABLE RANGE

BACKGROUND OF THE INVENTION

1. Field of the Invention

This invention relates to a communication system and, more particularly, to clock recovery circuits within nodes of the communication system that avoid producing a clock frequency outside an acceptable range whenever the clock recovery circuits recover a clocking signal from the communication system that is not immediately derived from a node having a clocking signal master.

2. Description of the Related Art

A communication system is generally well known as containing at least two nodes interconnected by a transmission line. Each transmission line can accommodate not only digital data, but also data that can arrive as voice data, audio data, video data, or bursts of data derived from a computer domain. An optimal transmission line is therefore one that can receive information from a multimedia device, herein defined as any hardware and/or software module that can transfer information in whatever form upon the network. The transmission line can either be a copper wire, optical fiber, or a wireless transmission medium.

There are many types of multimedia devices. For example, a multimedia device can include a telephone, a compact disc (CD) player, a digital video disc (DVD) player, a computer, an amplifier, a speaker, or any device that can send and receive different types of data across the transmission line of the network.

Popular types of data sent or received by multimedia devices include streaming data or packetized data. Streaming data is data that has a temporal relationship between samples produced from a source port onto the network. That relationship must be maintained in order to prevent perceptible errors, such as gaps or altered frequencies at the destination port. Packetized data need not maintain the sample rate or temporal relationship of that data and, instead, can be sent as disjointed bursts across the transmission line.

Depending on the frequency difference between the local clock of the source port (or destination port) and the network frame transfer rate, streaming data can be sent either synchronously or isochronously across the network. If the sample rate (i.e., "fs") local to the node is the same frequency as the frame synchronization rate (i.e., "FSR") of the transmission line, then the streaming data can be sent synchronously across the network. In many instances, FSR is dissimilar from fs. Thus, the sample rate must be changed (or converted), or the streaming data must be sent isochronously across the network, where isochronous transfer protocols are used to accommodate the frequency differences in order to prevent perceptible gaps, errors, jitter, or echo. Regardless of how data is being sent across a transmission line, the data must nonetheless be referenced to a clock. The clock (sometimes known as a master clock) placed in one node synchronizes the transmission from that node across the transmission line.

Referring to FIG. 1, a communication system 10 is shown. System 10 includes a plurality of nodes 12. Each node can include a transceiver, an input/output port and a multimedia device. Data sent across a transmission line 14 can, therefore, be used by a multimedia device within the destination node.

FIG. 1 illustrates transfer of data from node 12d, beginning with a preamble at time $T_1$, through each of the nodes 12c, 12b, and 12a, with substantially similar delay ($\Delta T0$) through each node.

FIG. 1 illustrates typical clock recovery mechanisms used within nodes 12. Generally speaking, one node (e.g., node 12d) of communication system 10 has a local master clock which can be derived from an external crystal 18, for example. Data transferred from node 12d can be synchronized to the master clocking signal as it traverses the transmission line. The master clocking signal may be recovered by a phase-locked loop, for example, at each of the various slave nodes 12a-c. The phase-locked loop ("PLL") 20, therefore, produces a recovered clock that is used to synchronize a digital subsystem, such as a local microcontroller 22.

The clock recovery circuit and, more particularly, PLL 20 within each of the slave nodes simply reconstructs the master clock 18 dedicated to a particular node 12d. Communication system 10 thereby requires that one node have a dedicated clock master (i.e., a master node) and all other nodes are absent a clock master (i.e., all other nodes are slave nodes). If two nodes employ a clock master, then one master might drift in frequency relative to another. The result might be perceptible gaps, errors, or echo at the destination node relative to the source node transmission. It is important to establish one master node and all other nodes as slave nodes. It is sometimes difficult at best to determine which node should be the master. The problem is compounded if the same node always remains as the master, yet the master clock within that node drifts from its targeted frequency.

FIG. 2 illustrates a plausible outcome if the clock master were to drift or altogether disappear. In the latter instance, each node would operate as a slave, and the frequency by which bits of data are transferred across the transmission link would fluctuate upward or downward with seemingly little if any constraint. As shown, preamble N followed by frame N dispatched from node D will be delayed as it passes through node C. Likewise, the preamble N and frame N will be further delayed through node B and, finally, through node A. Node D preferably contains a buffer 26 (FIG. 1) that synchronizes the frame of data received from node A and places that frame in the next frame location within frame N+1, as shown by arrow 28.

While each node has a corresponding delay, $\Delta T0$, the delay through the master node, $\Delta T_{BUF}$, is purposely timed so that it is synchronized to the next preamble N+1. The amount of delay $\Delta T_{BUF}$ is, therefore, dependent on the buffer being clocked synchronous with the local master clock, and that the master clock purposely synchronizes the preambles of succeeding frames. If there is no local master clock, then $\Delta T_{BUF}$ can fluctuate or altogether disappear. The fluctuation is passed from node to node as each PLL attempts to lock yet fails temporarily. The periodic unlock at each PLL, before the PLL can again retain lock travels around the ring, and is hereinafter referred to as a "rotating unlock" condition.

While it is important to avoid the all slave circumstance and the ensuing rotating unlock condition, not all communication systems can be assured of having a dedicated clocking master at all times. For example, depending on how the nodes are compiled onto the communication system, there may be instances in which the integrated circuits provided by manufacturers at various nodes simply do not contain master capabilities. Conversely, while each node might have master capability, a configuration register within the corresponding nodes may not be properly set to enable a single clocking master. Instead, possibly competing clocking masters might be established or no clocking masters whatsoever. Thus, while the flexibility of having an integrated circuit be either a master or slave is beneficial, it is not always possible to ensure the software program which sets the integrated circuits as a master or a slave is properly functioning. Certainly, manufacturers do no choose to make integrated circuits that operate solely as a master or solely as a slave, and application engineers do not always have the luxury of deciding which node should be the master and which remaining nodes should be the slave if, indeed, software and/or hardware configurations malfunction.

It would be desirable to introduce a communication system that, regardless of any malfunction, always assures the data transferred throughout the transmission line does not exceed or is less than a threshold frequency of a reference clocking master. It is inconsequential where the reference clocking master is derived, or whether instances of all slave and rotating unlock occur. Provided the unlock conditions do not rise to the level of inappropriate clocking frequencies outside an acceptable range, a dedicated clocking master within a specific node is purposely avoided for reasons set forth below.

SUMMARY OF THE INVENTION

The problems outlined above are in large part solved by a communication system that utilizes an improved clock recovery circuit. The clock recovery circuit, as well as all other clock recovery circuits, within the communication system can function as a clock slave. The communication system can thereby incur an all slave circumstance with a rotating unlock condition. When all clock recovery circuits are designed to produce a recovered clock from data traversing the transmission line, no node thereby has a dedicated clock master.

Instead of having to make sure one node of the plurality of nodes always has a dedicated master, or to ensure that all other nodes within the plurality of nodes are dedicated slaves, the present communication system can allow for an all slave circumstance where no nodes have a dedicated master and all nodes operate as a slave. In this way, software configuration malfunctions will not cause an inappropriate configuration of a node to a master when it should have been a slave, or vice-versa. The present communication system automatically triggers a reference clock in lieu of a clock associated with an incoming (i.e., received) bitstream of data forwarded to the clock recovery circuits. The reference clock is triggered when an unlock of the phase-locked loop (PLL) occurs, and the incoming bit rate (i.e., bitstream frequency) exceeds or is less than a desired range, or threshold, from a reference clock frequency. Similarly, the present communication system can de-select the reference clock if the incoming bitstream frequency is within the desired threshold. The ability to selectively activate a reference clock, compare the reference clock frequency to the incoming bitstream frequency, and choose to either use the reference clock or the incoming bitstream as the clock recovered from the clock recovery circuit is preferably instilled in each clock recovery circuit of each node. Using the selective clock recovery methodology thereby avoids having to dedicate a particular node as a master and all other nodes as a slave.

According to one embodiment, a clock recovery circuit is provided. The clock recovery circuit can be found within a node of the communication system and includes a PLL coupled to produce a recovered clock from either a reference clock or a incoming bitstream received by the PLL. An oscillator is coupled to produce a reference clock independent of the incoming bitstream, and a frequency comparator compares the incoming bitstream frequency and the reference clock frequency and, if the incoming bitstream frequency is greater than a threshold value above or below the reference clock frequency, a multiplexer coupled to the frequency comparator forwards the reference clock onto the transmission line and/or the local synchronous system.

Instead of a frequency comparator, any comparator can be used which compares a value proportional to the recovered clock frequency to another value proportional to the reference clock frequency. For example, that value can be either voltage or current. For example, a voltage value proportional to the incoming bitstream frequency can be compared against a voltage value proportional to the reference clock frequency. If the incoming voltage value is greater than a threshold value above or below the reference voltage value, then the comparator will forward the reference voltage value instead of the recovered voltage value. In essence, the comparator is used to compare frequency, voltage, or current, and operates to determine whether the incoming bitstream frequency, voltage, or current is within range.

If a frequency comparator is used, the multiplexer is placed in front of the PLL, and selects either a clock attributed to the incoming bitstream or the reference clock for placement into the PLL. However, if the value being compared is current or voltage, the current or voltage comparator dispatches the select signal to a multiplexer that is placed in front of a voltage-controlled oscillator that forms a part of the PLL.

Comparing voltage or current values can avoid having to employ a separate oscillator, such as a crystal oscillator used when performing frequency comparison. If frequency is being compared, the oscillator includes any circuitry (either internal or external to the clock recovery circuit) in which a regular and periodic pulse is generated. According to one example, the oscillator can be a crystal oscillator that produces a reference clock only during times when a lock state machine associated with the clock recovery circuit detects an unlock condition. The lock state machine will then initiate the oscillator and, depending on whether the frequency comparator outcome yields a comparison outside the threshold, the reference clock output from the oscillator can then be selected. The lock state machine preferably determines an unlock condition by counting the number of data bits transferred between preambles of a frame. If the number of bits exceeds or is less than a predefined amount, then an unlock condition can be determined. The oscillator will cease production of the reference clock when the lock state machine determines a lock condition has occurred, and the frequency detector will ensure the output from the inactive oscillator is not used when the number of data bits transferred between preambles is within a predefined amount.

The comparator compares the periodic transitions of the incoming bitstream (represented either as frequency, voltage or current) to the periodic transitions of the reference clock (either frequency, voltage or current) and, depending on that comparison, selects either the incoming bitstream clock or the reference clock (represented either as a frequency, voltage or current value). If a frequency comparator is used, the oscillator only operates during instances of unlock in order to prevent unnecessary noise during instances of lock (i.e., when the recovered clock is locked with the incoming bitstream or reference clock).

The reference clock or reference voltage/current value is essentially a nominal value. In other words, the reference clock voltage or current amounts are predefined as an acceptable frequency, voltage, or current value. The incoming bitstream voltage or current values that are proportional to an incoming bitstream frequency, and if that value exceed a threshold value above the nominal amount, then the frequency, voltage, or current comparator will send an appropriate select signal to a multiplexer which will then select the nominal value or reference value—that value being either the reference clock, a reference voltage, or a reference current.

The clock recovery circuit may be contained within a communication system. The communication system includes a first node and a second node interconnected to each other by a communication link. The first node is absent a master clock and, therefore, a bitstream of data sent across the communication link is not synchronized to a master clock dedicated to the first node. The second node containing a clock recovery circuit receives the bitstream of data and selectively sends a recovered clock (that transitions at either the incoming bitstream frequency or the reference clock frequency) to the downstream digital subsystem.

According to yet another embodiment, a method is provided. The method includes several steps that occur during initialization of the communication system. For example, a reference clock is produced during a power-on reset and data is then synchronized to the reference clock and sent across a communication link. Thereafter, the reference clock can be terminated preferably when the synchronized data recovered by a node is locked to the reference clock at some moment shortly after initialization. Once the reference clock is terminated and the communication system enters an all slave condition, periodic unlock can be detected traversing the loop topology as part of the rotating unlock condition. Once an unlock is detected, the reference clock is again produced and the data resynchronized to the reference clock if the incoming data bitstream has a bit rate (or voltage/current equivalent thereof) that is greater than or less than a threshold from the recovered clock or reference clock frequency (or voltage/current equivalent thereof). Once the bit rate is placed back within that threshold by virtue of the resynchronization to the reference clock, the reference clock can then be terminated again. In the case of a frequency comparison using an oscillator, the method, therefore, indicates periodic enabling of a reference clock and disabling of a reference clock and, accordingly, resynchronization to the reference clock at certain times—otherwise, synchronization occurs relative to the recovered clock produced from, for example, the PLL.

BRIEF DESCRIPTION OF THE DRAWING

Other objects and advantages of the invention will become apparent upon reading the following detailed description and upon reference to the accompanying drawings in which.

DETAILED DESCRIPTION OF PREFERRED EMBODIMENTS

Figure 1:
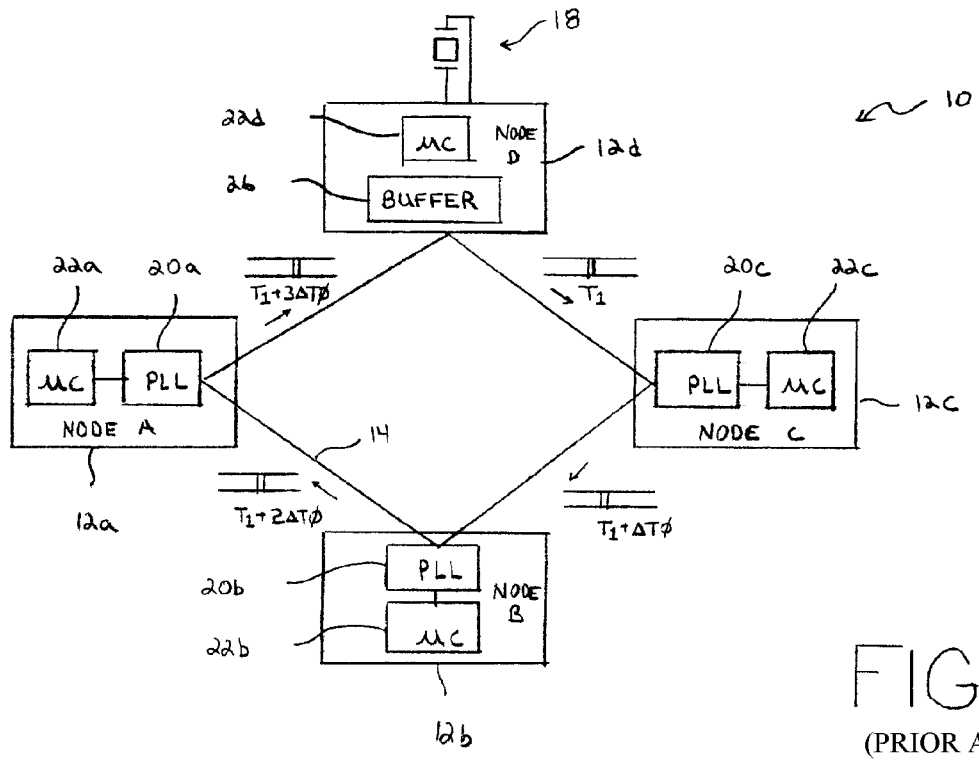
FIG. 1 is a block diagram of a communication system having interconnected nodes that send and receive data transferred at a rate synchronized to a clocking signal produced by a node having a dedicated clocking signal master, according to convention design.
Figure 2:
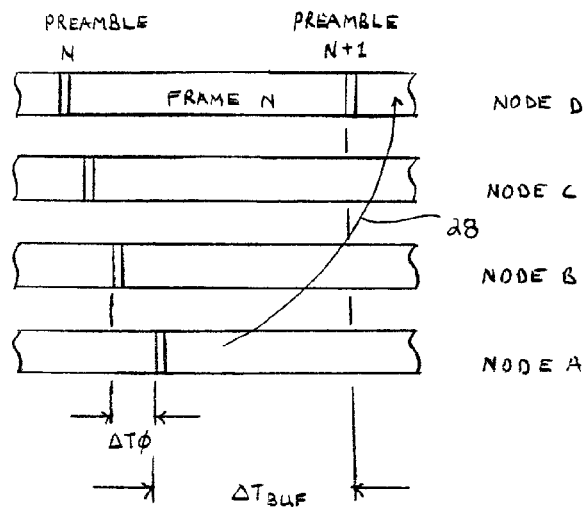
FIG. 2 is a sequence of bytes of data following a preamble, wherein the preamble and bytes of data are delayed by $\Delta T0$ through each node and, in order to ensure data is sent around the ring topology in synchronous frame order, a buffer within the master temporarily stores data during $\Delta T_{BUF}$ received during frame N for placement into frame N+1.
Figure 3A:
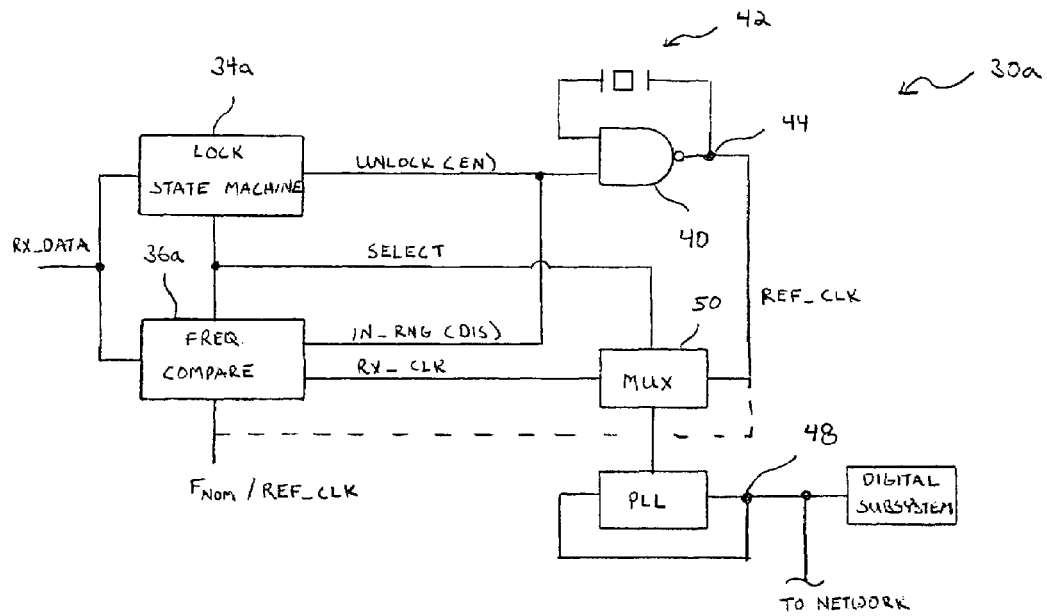
FIG. 3a is a block diagram of a node comprising a clock recovery circuit that compares the frequency of an incoming bitstream with a reference frequency in determining whether the incoming bitstream frequency or a reference clock frequency is to be used as the recovered clock.

Turning now to the drawings, FIG. 3a illustrates a block diagram of a clock recovery circuit 30a preferably contained within a communication system. More specifically, clock recovery circuit 30a is found within each node of an interconnected plurality of nodes within a communication system. Data sent across the transmission line is received as RX_DATA into a lock state machine 34a and a frequency detector 36a. Lock state machine 34a determines whether the incoming frames of data are in sync with each other. If the preambles arrive at a change in frequency, then an unlock signal can be sent from lock state machine 34a. The unlock signal will then be forwarded to, for example, a logic gate 40. The unlock signal will then trigger operation of the oscillator 42.

Oscillator 42 can be a crystal oscillator, possibly connected to input pins of an integrated circuit embodying clock recovery circuit 30a. A reference clock is generated at node 44 when the unlock signal is placed on gate 40. At times when an unlock signal is not present, then the reference clock is disabled and no oscillation appears at node 44.

The unlock signal is periodically sent from the lock state machine whenever a node containing circuit 30a receives, for example, a rotating unlock condition. Lock state machine 34a will periodically detect the unlock condition as it traverses the node on its way around the ring of the communication system. When the unlock condition is not encountered, circuit 30a is generally considered to be in a locked condition. Yet, however, circuit 30a might be recovering a clock that skews upward in frequency between unlock conditions as the received data drifts upward. Thus, as the received data increases (or decreases) in frequency, that increase (or decrease) will be detected on the next unlock condition determined by lock state machine 34a.

If the activated reference clock at node 44 represents the desired recovered clock frequency, then the drift in frequency at the received data will be registered at the output of frequency detector 36a and eventually placed into phase-locked loop 46 if the reference clock is not selected. The frequency drift of the recovered clock at node 48 is compared by frequency comparator 38a to a nominal frequency that is preferably the frequency of the reference clock at node 44. If the amount of drift extends above or below a threshold frequency value from the reference clock frequency, then frequency comparator 36a will send a select signal to a selector (e.g., a multiplexer) 50, which then selects the reference clock at node 44 instead of the clock of the received bitstream at node 48. The selected clock will then be forwarded onto the local digital subsystem 54, as well as possibly to another downstream node upon the communication system or network.

Frequency comparator 36a essentially compares the frequency of the incoming bitstream (RX_DATA) with a nominal frequency or reference frequency attributed to a reference clock (RIF_CLK). If the frequency of the incoming bitstream is within a threshold of the reference clock frequency, then frequency comparator 36a will send an in-range (IN_RNG) signal to logic gate 40. Frequency comparator 36a also sends a select signal to multiplexer 50. The in-range signal can be used possibly to deactivate oscillator 42 as a power saving feature, even though lock state machine 34a might still be sending an unlock signal.

If frequency comparator 36a detects an out-range condition where the received bitstream is above or below a threshold from the reference clock frequency, it can send an OUT_RNG signal. This condition will note that when the lock state machine receives the next unlock condition, oscillator 42 will be enabled and the reference clock at node 44 will compare to the incoming bitstream via multiplexer 50.

The clock recovery circuit 30a is preferably contained within a node of multiple nodes connected around a communication system ring. Thus, any instances of unlock on a particular node will cause the reference clock to be activated and to operate essentially as a master clock. The master clock can occur at any node within the communication system, and is purposefully not dedicated to a particular node. The master clock frequency will synchronize the transmitted data as the transmitted data is sent to the next node.

The recovered clock node 48 starts off essentially being equal to the reference clock at node 40, albeit having a slight deviation recovered after the transmitted data has been sent essentially around the entire loop or ring. Any impermissible fluctuations of the recovered clock are periodically detected when the rotating unlock condition occurs at the local node so that if the incoming data stream deviates substantially more than a threshold from the recovered clock frequency, then the frequency detector will detect that out-of-range condition to cause activation of the reference clock at the time in which an unlock condition occurs.

The operation of a frequency comparator, multiplexer, and phase-locked loop are generally well-known. However, it is important to note that the lock state machine 34a has a particular function in detecting the rotating unlock condition that is a phenomenon of an all slave circumstance. That is, absent any dedicated master clock specific to a particular node, an unlock condition will be detected on one node and passed to the next node, where each node will recover that unlock condition as part of its clock recovery functionality.

The frequency comparator, however, will not be able to detect certain instances of unlock, yet is more suitable to detecting longer term frequency drifts. Frequency comparator 36a essentially operates as an oversampling circuit that compares the received data transitions of the incoming bitstream to the frequency of the reference clock. If the received data transitions at a time that cannot be sampled by the reference clock transitions, then an out-of-range condition occurs. Otherwise, sampling can occur in its normal course and frequency detector 36a produces an in-range condition or signal. Frequency detector 36a can, therefore, be thought of as any synchronous clocking system that compares, for example, a data stream to a clock signal where the data stream can be considered the received data stream and the clock signal can be considered the reference clock signal. Popular such synchronous digital systems include flip-flops and the like.

The threshold at which frequency comparator 36a determines whether an in-range condition exists and whether the reference clock should be forwarded can be set to almost any value. According to one example, the threshold can be between 1% and 10%, more preferably, between 1% and 5% and, possibly, even more preferably depending on the application and a greater need for accuracy, between 0.05% and 2%. In other words, if the incoming data rate exceeds the recovered clock frequency by greater than (or less than), for example, 5%, then an out-range condition occurs that is passed to the PLL 46 and, when compared to the reference clock, the reference clock is chosen in lieu of the incoming bitstream. Otherwise, if the incoming data rate is within one threshold of the reference clock frequency, then an in-range condition occurs to cause deactivation of the reference clock. Thus, if the incoming bitstream exceeds a threshold of, for example, 5% of the frequency of the reference clock, then the frequency comparator generates a select signal which chooses the reference clock instead of the bitstream. If the bitstream frequency is within, for example, a 5% threshold of the reference clock, then frequency comparator 36a will send a select signal to choose the bitstream instead of the reference clock.

Figure 3B:
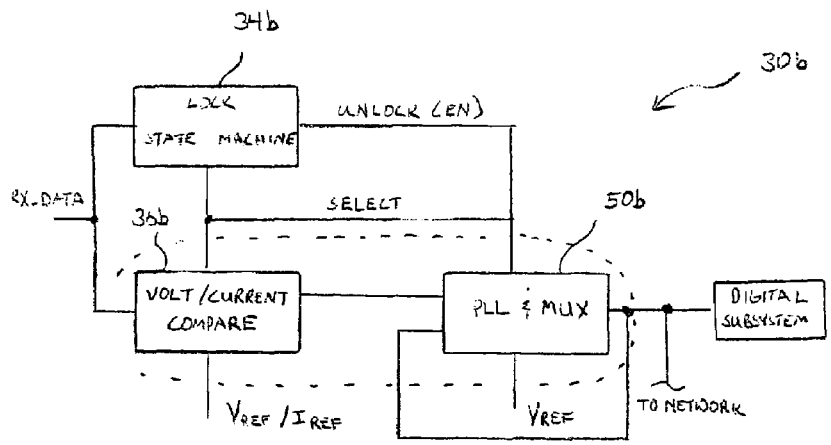
FIG. 3b illustrates an alternative embodiment to that of FIG. 3a, whereby a incoming bitstream value proportional to the frequency of the incoming bitstream is compared to a reference value proportional to a reference.

FIG. 3b illustrates an alternative embodiment for the clock recovery circuit and is shown as clock recovery circuit 30b. Instead of comparing the frequency of the incoming bitstream with a frequency of a reference clock, circuit 30b compares a voltage or current value corresponding to the incoming bitstream frequency with a voltage or current value corresponding to the frequency of a reference clock. If voltages are compared, then a voltage comparator 36b forms the comparison between a reference voltage and a voltage proportional to the incoming bitstream frequency. If the voltage of the incoming bitstream frequency is within a particular range, then a multiplexer 50b might select the incoming bitstream voltage as opposed to the reference voltage for placement onto, for example, a voltage-controlled oscillator attributed to a PLL. Voltage comparator 36b forms the comparison and forwards an appropriate select signal to the multiplexer 50b, similar to the embodiment shown in FIG. 3a. Likewise, the lock state machine 34b operates similar to lock state machine 34a shown in FIG. 3a. However, instead of using a multiplexer to decide which frequency to choose for placement onto a downstream PLL, as in the embodiment of FIG. 3a, FIG. 3b embodiment notes that the multiplexer forms a part of the PLL. The multiplexer 50b will choose a voltage for input onto a voltage-controlled oscillator of the PLL, as described in more detail in FIG. 4.

Figure 4:
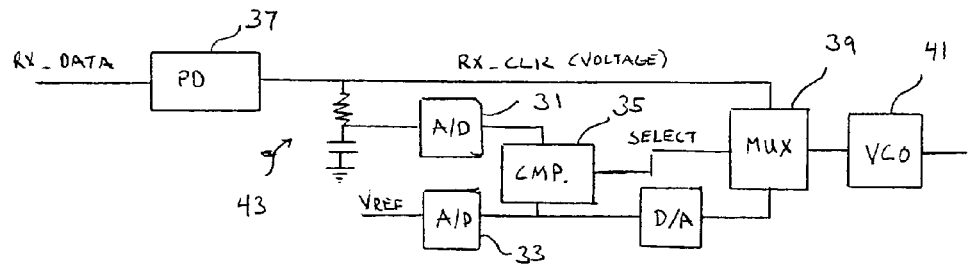
FIG. 4 is a block diagram of the current/voltage comparator, multiplexer and PLL of the embodiment of FIG. 3b.

FIG. 4 illustrates that which is surrounded by a dashed line in FIG. 3b. The voltage comparator 36b can comprise the analog-to-digital or equivalent circuits 31 and 33, as well as comparator 35. The incoming bitstream is fed into a phase and/or frequency detector 37 which then forwards a voltage equivalent to the incoming bitstream frequency onto a low-pass filter 43 associated with the overall PLL. The voltage equivalent is then compared against a reference voltage by comparator 35. If the voltage equivalent is within a predefined range of the reference voltage, then a select signal is sent to the multiplexer 39 to select the voltage associated with the incoming bitstream instead of the reference voltage. Otherwise, the select signal would select the reference voltage.

Once the appropriate voltage is selected by multiplexer 39, then the voltage-controlled oscillator 41 will produce the appropriate and corresponding incoming bitstream frequency or the reference clock frequency as the recovered clock.

Figure 5:
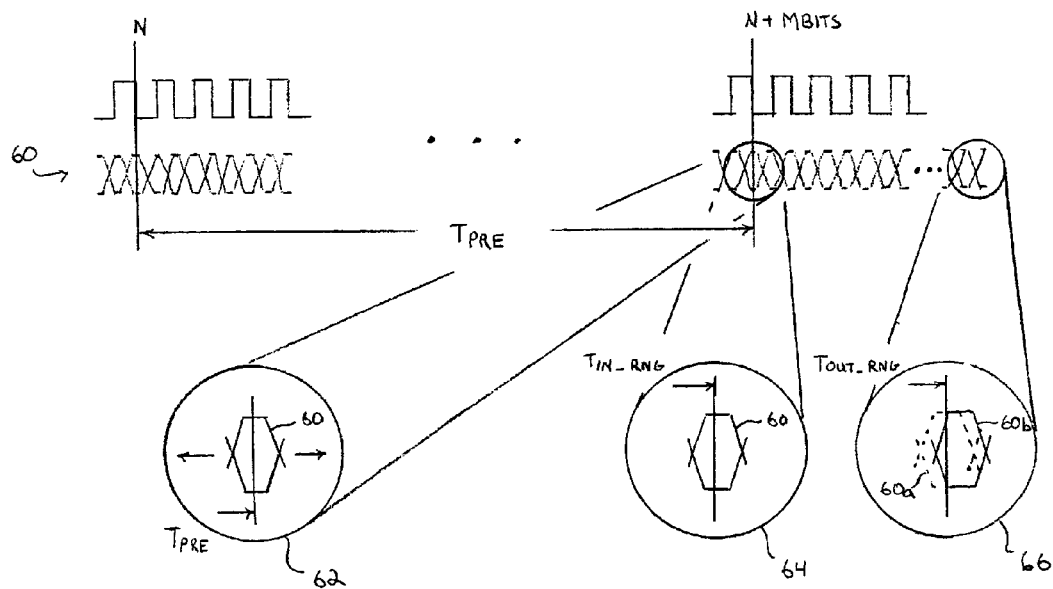
FIG. 5 is a timing diagram of the detection of an unlock condition and an amount by which the incoming data frequency exceeds or is less than the locked frequency (e.g., the reference clock frequency immediately subsequent to initialization)

FIG. 5 illustrates a timing diagram of the incoming bitstream of data 60 sent as part of a packet of M bits. Preferably, the last bit of M bits is counted before the beginning of the next preamble at $T_{PRE}$, as shown in detail 62. Thus, if a frame of data contains, for example, 512 bits, then the last bit of the preamble should register a count of 512. However, if an all slave condition occurs, then there may be greater than or fewer than 512 bits sent between coding violations which represent the beginning of each preamble. Therefore, instead of registering 512 bits, a bitstream which has sped up might register 513 bits counted at time $T_{PRE}$. The additional bit count (or lack thereof) is naturally encountered whenever the transmitted data is not synchronized to a dedicated master clock. However, while an all slave condition and ensuing rotating unlock occurrence is acceptable, what is more desirable is to prevent what would normally arise from such circumstances.

As long as the unlock condition triggers a reference clock, when compared to the incoming bitstream that has possibly been skewed as a result of a slave drift, it will resynchronize the transmitted data to prevent the rotating unlock condition from continuing on endlessly. Thus, the clock recovery circuit hereof periodically brings any recovered clock skew back to the reference clock at each instance of unlock provided, of course, the frequency comparison is unfavorable. In addition to detecting unlock conditions, the timing diagram of FIG. 5 also illustrates periodic detection of a frequency skew or drift.

As shown in FIG. 5, the data signal can be periodically sampled. If a skew occurs, then the frequency comparator 36a (FIG. 3a) will note that possibly sampling can no longer take place. This would be the case if, for example, the data signal transitions within a set-up or hold time relative to a sampling clock used to sample those data transitions. As shown in the detailed view 64, if the first sample and the second sample essentially register a sample transition between transitions of the data signal 60, then there is little, if any, frequency drift or skew. However, if the initial reading shows sample clock being between transitions of the data clock, yet the subsequent reading shows the sample clock being within a set-up or hold time, then frequency skewing has occurred, as shown by detail 66. More particularly, detail 66 illustrates in phantom data transition 60a occurring at a proper position, yet due to frequency shift occurs at position 60b, delayed from position 60a. The shift in phase indicates that if data transitions were initially at the same location yet, when taken at a subsequent data bit, indicates a shift in phase as shown in detail 66, frequency of the received bitstream has slowed down relative to the reference clock frequency. Thus, detector 36 will note an out-of-range condition. The frequency change will be registered upon the recovered clock at node 48 and compared to the reference clock to determine whether the reference clock should be used in lieu of the recovered clock.

Figure 6:
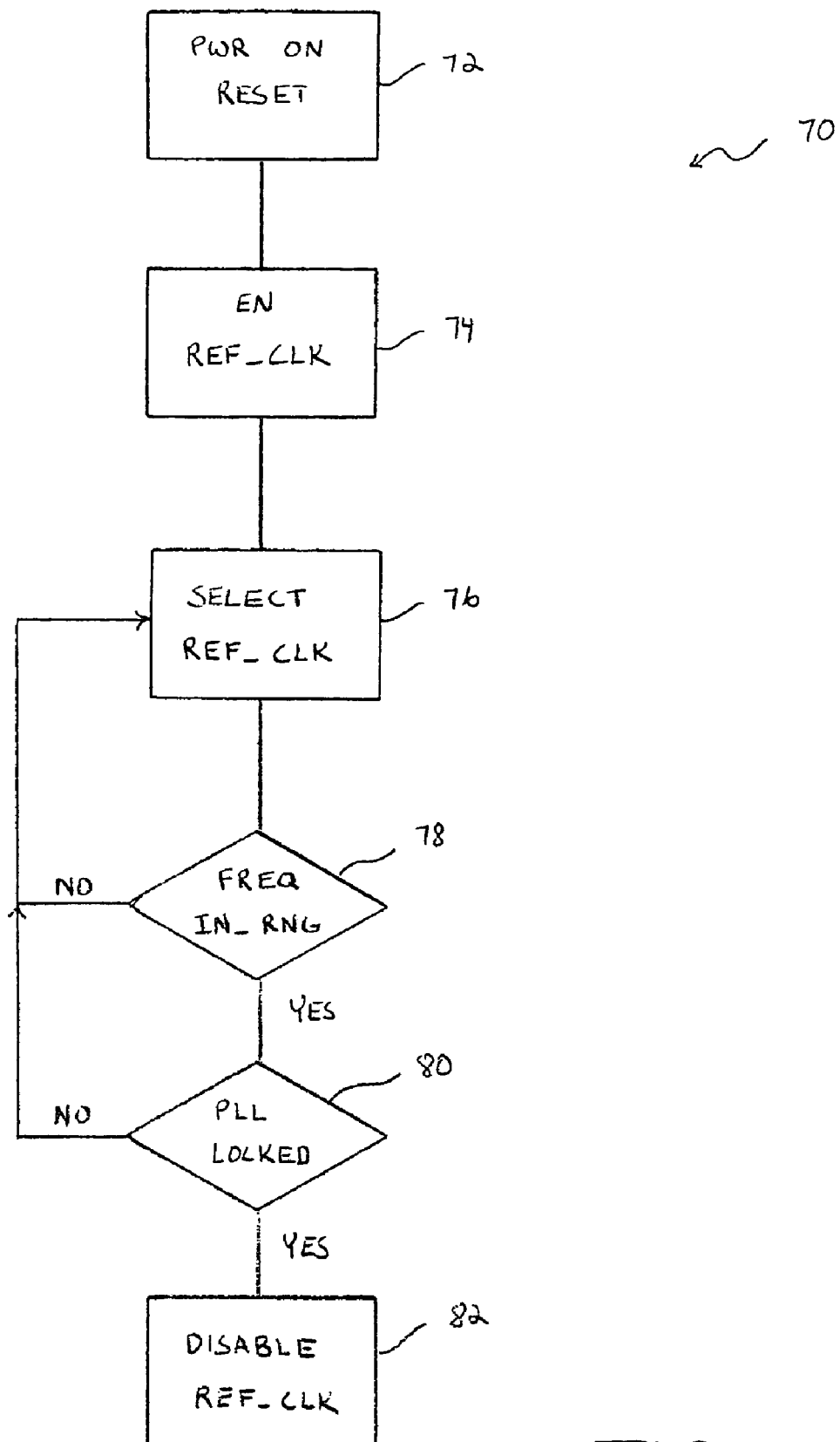
FIG. 6 is a flow diagram of steps taken at power-on reset of the communication system or circuit of FIGS. 3a or 3b by initializing the reference clock and allowing the PLL of FIGS. 3a or 3b to produce a recovered clock locked in frequency with the incoming data, whereupon the reference clock is disabled in favor of the recovered clock when the incoming data is within a frequency threshold of the reference clock and the PLL is locked.

FIG. 6 illustrates a flow diagram 70 of the operation of recovery circuit 30. When the communication system is initiated, each node in corresponding recovery circuit is reset 72. Upon receiving power to the circuit and corresponding reset, the reference clock is enabled by, for example, sending an enable signal to the logic gate (FIG. 3). The enabled reference clock at block 74 allows for the circuit to decide whether to select the reference clock or not. However, since only the reference clock is active and the recovered clock has not yet reached a steady state or locked condition, the reference clock is selected as shown by block 76.

Throughout initiation, the reference clock remains active until the transmitted data is synchronized to the reference clock, and the frequency detector determines that the received data frequency is within a threshold range of the reference clock frequency. Determination of whether the frequency is within range is shown by decision block 78. If the frequency is not within range, then the reference clock remains enabled. However, if the frequency is within range, then a determination must be made on whether or not the PLL is locked (i.e., the recovered clock is locked in frequency and phase with the received bitstream). If the PLL is not locked, then the reference clock remains enabled. However, if the incoming bitstream is within a frequency range of the reference clock and the PLL is locked as shown by decision block 80, then the reference clock is disabled 82.

FIG. 6 illustrates the steps taken during initialization of the clock recovery circuit, from the time in which the reference clock is enabled until the time in which the bitstream is synchronized to the reference clock, and the frequency detector determines the bitstream is within range of the reference clock and the PLL is locked to cause the reference clock to be disabled.

Figure 7:
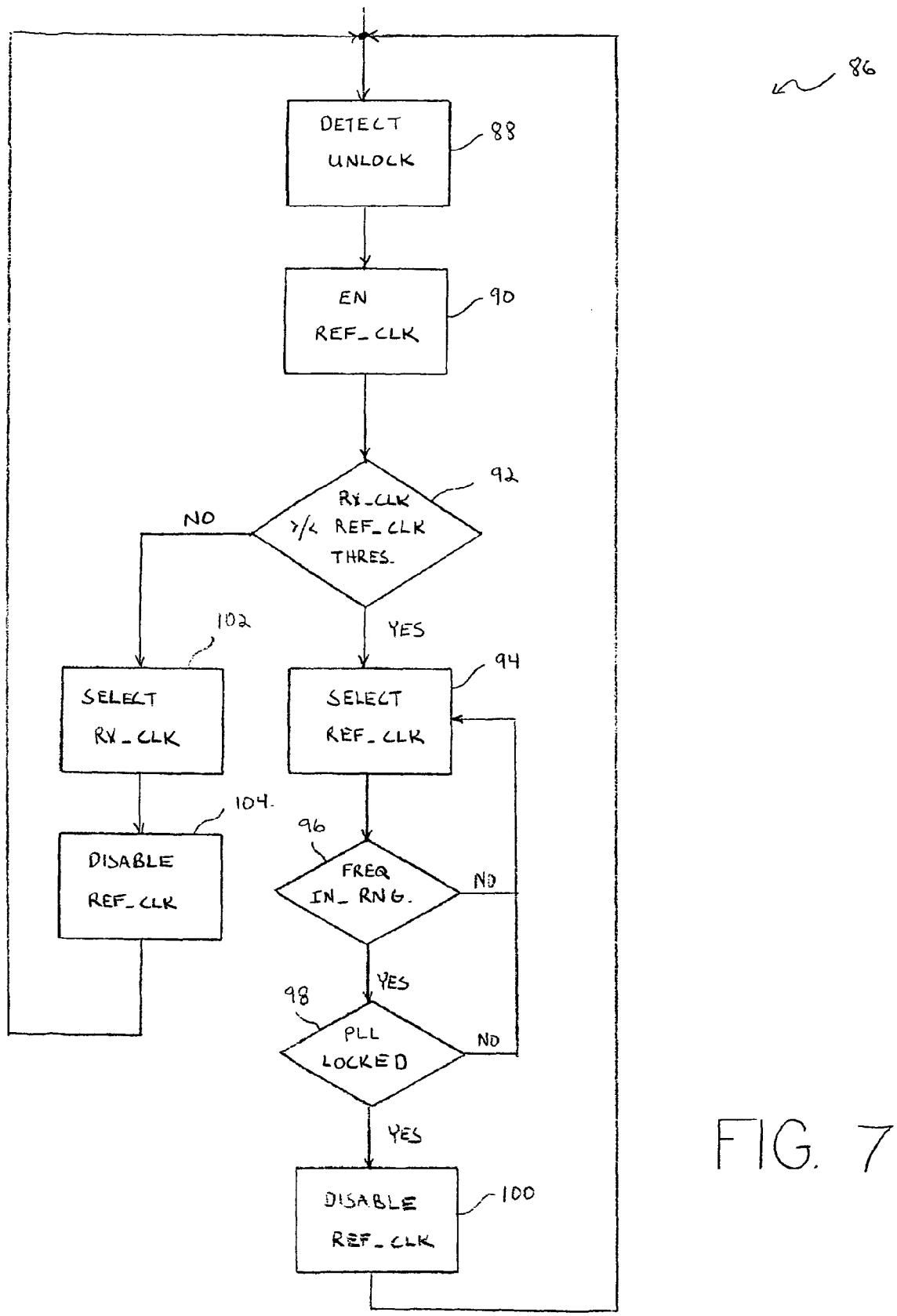
FIG. 7 is a flow diagram of steps taken after power-on reset and after the recovered clock is being used, whereby an unlock condition is detected by the lock state machine of FIGS. 3a and 3b and the reference clock can be substituted for the recovered clock to bring the incoming data frequency back to within a threshold of the reference clock, and thereafter the reference clock can again be disabled in favor of the recovered clock.

FIG. 7, however, illustrates a flow diagram 86 of what happens after initialization, beginning with the reference clock being disabled and the communication system being in an all slave condition with a rotating unlock occurring. Once an unlock is detected by the lock state machine, as shown by block 88, the lock state machine will then trigger an oscillator to enable a reference clock, as shown by block 90. The incoming bitstream (or possibly the recovered clock) is then compared against the reference clock as shown by decision block 92. If the bitsteram is greater than or less than a threshold value from the frequency of the reference clock, then the reference clock is selected as shown by block 94. The reference clock remains selected until the comparator detects an in-range condition and the PLL is locked, as shown by decision blocks 96 and 98, respectively. If both decisions 96 and 98 yield an affirmative, then the reference clock is disabled as shown by block 100.

If the incoming bitstream is within a predefined threshold of the reference clock, then instead of selecting the reference clock, the bitstream frequency is selected as shown by block 102. Either the reference clock will be disabled when the lock state machine ceases its production of an unlock signal, or the frequency detector sends an in-range signal to disable the reference clock as shown by block 104.

The process of flow diagram 86 is repeated each time the reference clock is disabled, thus, forcing an all slave circumstance and ensuing rotating unlock condition. The clock recovery circuit will then periodically activate a reference clock and either use the reference clock or the recovered clock depending on how far above or below in frequency the bitstream is from the reference clock. Thereafter, the reference clock will be disabled with the clock associated with the bitstream used exclusively.

By design, the present communication system allows for each node to operate as a slave, without any dedicated master placed at one of those nodes. A master can be periodically invoked, however, at a node and the master certainly is not invoked at the same node each time as in conventional, dedicated master clock systems. The clock recovery circuit found in each node is designed to switch in and out of a reference frequency (i.e., in and out of a master mode). The oscillator and frequency comparator attributable to a master mode is purposely activated only at select times since it is desired that they need not operate at all times and power consumption of such operation might be an issue, as well as the noise created by constant operation of the oscillator and frequency comparator circuits. This certainly is the case since, during times when the oscillator is operating, the oscillator may run asynchronous to the all slave network. This may cause significant noise if the oscillator and frequency comparator were always on. The threshold established within the comparator is essentially any value which is predefined and, depending on the application, can vary significantly. The threshold can, therefore, be varied or modified depending on the circumstances as will become apparent to those skilled in the art once the above disclosure is fully appreciated. It is intended that the following claims be interpreted all such variations and modifications, as well as others set forth above.

What is claimed is:

1. A clock recovery circuit, comprising:
   a comparator coupled to receive a received value proportional to a frequency of the incoming data stream and to compare that value to a pre-determined reference value that is independent of the incoming data stream;
   a multiplexer coupled to receive the received value and the reference value, and to select the reference value in lieu of the received value if said received value is greater than a threshold value above or below the pre-determined reference value; and
   an oscillator coupled to the multiplexer to produce a recovered clock having a frequency proportional to the reference value.

2. The clock recovery circuit as recited in claim 1, wherein the received value and the pre-determined reference value each comprise voltage, current or frequency.

3. A clock recovery circuit, comprising:
   an oscillator coupled to produce a reference clock that is independent of a bitstream forwarded to the clock recovery circuit;
   a frequency comparator coupled to compare a frequency of the bitstream with a frequency of the reference clock;
   a multiplexer coupled to the frequency comparator to select the reference clock in lieu of the bitstream if the frequency of the bitstream is greater than a threshold value above or below the frequency of the reference clock; and
   a phase-locked loop coupled to produce a recovered clock having a frequency substantially equal to the frequency of the reference clock.

4. The clock recovery circuit as recited in claim 3, wherein the oscillator comprises a crystal oscillator.

5. The clock recovery circuit as recited in claim 3, wherein the oscillator is coupled to produce the reference clock only during times when a lock state machine determines a number of data bits transferred between preambles of a frame of said bitstream exceeds or is less than a pre-defined amount.

6. The clock recovery circuit as recited in claim 3, wherein the oscillator is coupled to cease production of the reference clock during times when the frequency comparator detects a bit rate of the bitstream is within a pre-defined amount of the frequency of the reference clock.

7. The clock recovery circuit as recited in claim 3, wherein the frequency comparator is coupled to compare a bit rate of the bitstream and the reference clock only during times when the oscillator is producing the reference clock, otherwise the frequency comparator forwards the bitstream in lieu of the reference clock.

8. The clock recovery circuit as recited in claim 3, wherein the frequency of the reference clock is substantially fixed and the frequency of the bitstream varies.

9. The clock recovery circuit as recited in claim 3, wherein the multiplexer is coupled to forward the reference clock to a digital subsystem within a node local to the clock recovery circuit or across a transmission line to a digital subsystem within a node distal to the clock recovery circuit.

10. The clock recovery circuit as recited in claim 3, wherein the multiplexer is coupled to forward the reference clock in lieu of a clock derived from the bitstream during times when the recovered clock produced from the phase-locked loop is locked in frequency with the incoming bitstream.

11. The clock recovery circuit as recited in claim 3, further comprising:
   a lock state machine coupled to determine an unlock condition if a number of data bits transferred between preambles of a frame of said bitstream exceeds or is less than a pre-defined amount;
   wherein the frequency comparator is coupled to determine an in-range condition if a difference between a bit rate of said bitstream is within a pre-defined amount of the frequency of the reference clock; and
   a logic gate coupled to enable the oscillator and frequency comparator during the unlock condition and to disable the oscillator and frequency comparator during the in-range condition.

12. A clock recovery circuit, comprising:
   a phase-locked loop coupled to produce a recovered clock from a bitstream received by the phase-locked loop;
   a reference voltage proportional to a frequency of a reference clock;
   a voltage comparator coupled to compare the reference voltage with a voltage value proportional to a frequency of the bitstream; and
   a multiplexer coupled to the voltage comparator to forward the reference clock in lieu of the bitstream if the voltage value is greater than a threshold value above or below reference voltage.

13. The clock recovery circuit as recited in claim 12, wherein the reference voltage is substantially fixed and the voltage value proportional to the frequency of the bitstream varies depending on a rate by which the data is received by the phase-locked loop.

14. The clock recovery circuit as recited in claim 12, wherein the multiplexer is coupled to forward the reference clock to a digital subsystem within a node local to the clock recovery circuit or across a transmission line to a digital subsystem within a node distal to the clock recovery circuit.

15. The clock recovery circuit as recited in claim 12, wherein the multiplexer is coupled to forward the bitstream in lieu of the reference clock during times when the recovered clock produced from the phase-locked loop is locked in frequency with the bitstream received by the phase-locked loop.

16. The clock recovery circuit as recited in claim 12, wherein the multiplexer is coupled to forward the reference clock in lieu of the bitstream during times when the recovered clock produced from the phase-locked loop is not locked in frequency with the data received by the phase-locked loop.

17. A communication system, comprising:
   a first node and a second node interconnected to each other by a communication link, wherein the first node is adapted to place a bitstream of data absent synchronization to a master clock within the first node, and wherein the second node comprises:
      a clock recovery circuit adapted to receive the bitstream of data and selectively produce:
         a recovered clock of substantially variable frequency proportional to a transfer rate of the bitstream during times when a frequency of the recovered clock is within a pre-defined threshold; and a reference clock of substantially fixed frequency produced from a crystal oscillator during times in which a frequency of said recovered clock exceeds or is less than the pre-defined threshold, wherein the reference clock is produced only during times when a number of data bits transferred between preambles of a frame of said bitstream exceeds or is less than a pre-defined amount.

18. The communication system as recited in claim 17, wherein the reference clock is not produced during times when a bit rate of the bitstream is within a frequency range of the frequency of the reference clock.

19. The communication system as recited in claim 17, further comprising a third node adapted to receive the recovered clock or the reference clock forwarded by the clock recovery circuit.

20. The communication system as recited in claim 17, further comprising a digital subsystem adapted to receive the recovered clock or the reference clock forwarded by the clock recovery circuit.

21. A method of transferring data, comprising:
producing a reference clock during power-on reset of at least a portion of a communication system;
synchronizing the data to the reference clock; and
terminating the reference clock, and generating a recovered clock from the data and forwarding the recovered clock to a digital subsystem in lieu of the reference clock.

22. The method as recited in claim 21, further comprising:
detecting an unlock condition when the data becomes unsynchronized from the reference clock; and
producing a reference clock and re-synchronizing data to the reference clock if a bit rate of the data is greater than or less than a threshold from a frequency the reference clock.

23. The method as recited in claim 22, further comprising:
terminating the reference clock if the bit rate of the data is within the threshold from the frequency of the reference clock.

24. The method as recited in claim 21, wherein said producing a reference clock and synchronizing data further comprises forwarding the reference clock to a digital subsystem in lieu of a recovered clock generated from the data prior to said terminating the reference clock.

* * * * *